United States Patent [19]

Yamazaki et al.

[11] 4,083,339
[45] Apr. 11, 1978

[54] APPARATUS FOR HEATING INTAKE MIXTURE FROM EXHAUST GASES OF INTERNAL COMBUSTION ENGINE

[75] Inventors: Shuichi Yamazaki; Ikuo Kajitani, both of Saitama, Japan

[73] Assignee: Honda Giken Kogyo Kabushiki Kaisha, Tokyo, Japan

[21] Appl. No.: 725,411

[22] Filed: Sep. 21, 1976

[30] Foreign Application Priority Data

Sep. 22, 1975 Japan .................................. 50-128921

[51] Int. Cl.² ............................................ F02M 31/00
[52] U.S. Cl. ........................ 123/122 AC; 123/122 AB; 123/52 M; 261/145
[58] Field of Search ................. 123/122 AB, 122 AC; 261/144, 145

[56] References Cited

U.S. PATENT DOCUMENTS 3,964,460  6/1976  Nakano ........................ 123/122 AB
3,994,271  11/1976  Ishizuya ....................... 123/122 AC

*Primary Examiner*—Ronald H. Lazarus
*Attorney, Agent, or Firm*—Lyon & Lyon

[57] ABSTRACT

An internal combustion engine exhaust manifold has a lateral opening through which exhaust gases may heat intake mixtures for the engine. The exhaust manifold comprises a thick wall housingg enclosing a thin wall liner, the liner having inlet tubes receiving exhaust gases from the engine exhaust ports, and having a discharge pipe. The liner is secured in the lateral opening of the housing so that its inlet tubes and discharge pipes may move by differential expansion. Internally threaded sockets fixed to the liner extend into the housing opening and the sockets project through clearance openings in a stationary support ring fixed to the housing opening. Threaded fasteners are received in the sockets and a heat shield is mounted within the liner to prevent exposure of the ends of the threaded fasteners to the hot exhaust gases within the liner.

2 Claims, 2 Drawing Figures

APPARATUS FOR HEATING INTAKE MIXTURE FROM EXHAUST GASES OF INTERNAL COMBUSTION ENGINE

This invention relates to internal combustion engines and is particularly directed to a novel construction for heating intake mixtures from the exhaust gases, as well as providing a mounting for a thin wall liner within the thick wall housing of the exhaust manifold.

An exhaust manifold for an internal combustion engine has a lateral opening through which exhaust gases may heat an air-fuel mixture in the intake manifold or riser to insure vaporization of the air-fuel mixture. The exhaust manifold includes a thick wall housing for stiffness and strength, and also includes a liner spaced from and enclosed within the thick wall housing, the liner being formed of thin wall heat resistant material in order to maintain the exhaust gases at relatively high temperature for long residence time and thereby oxidize pollutants before the exhaust gases are discharged into the atmosphere. The inlet ports and the discharge port of the liner are constructed so as to permit differential expansion of the liner with respect to the enclosing housing. The present invention relates to improved apparatus for supporting the thin wall liner within the thick wall housing at the lateral opening in the housing. The parts of the liner forming the inlets and outlet are then free to move to accommodate differential expansion.

Supporting of the thin wall liner within the thick wall housing at the lateral opening in the housing is accomplished by providing a tubular extension on the liner which projects into the lateral opening in the housing. Internally threaded sockets fixed to the liner extend into the housing opening and are spaced laterally from the tubular extension. A stationary support ring fixed to the housing opening has a portion which encircles the tubular extension, and the sockets engage with that ring. Threaded fasteners received in the sockets extend through the support ring and a heat shield is mounted within the liner to prevent exposure of the ends of the threaded fasteners to the hot exhaust gases within the liner.

Other and more detailed objects and advantages will appear hereinafter.

Figure 1:
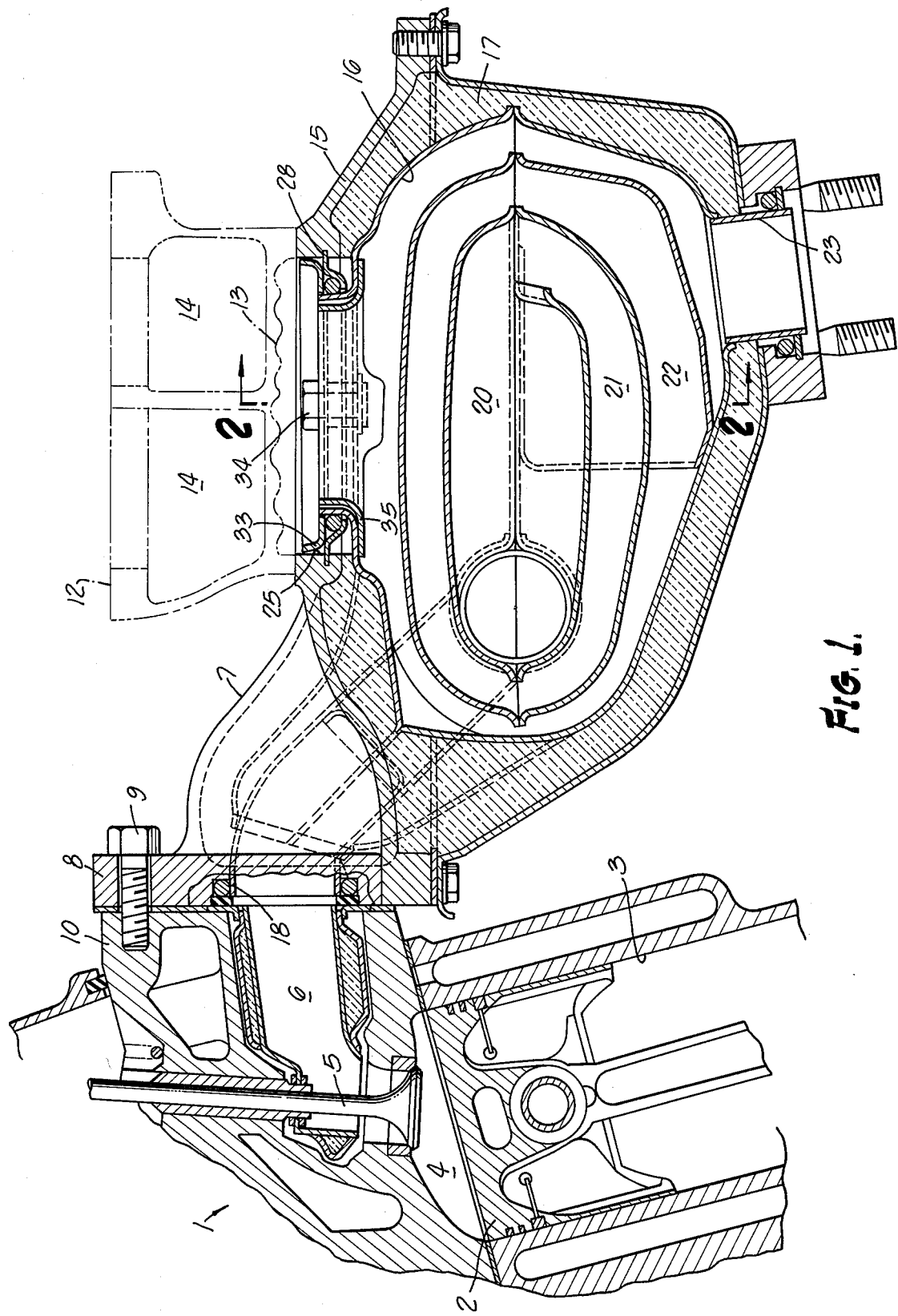
FIG. 1 is a sectional side elevation showing a preferred embodiment of this invention.
Figure 2:
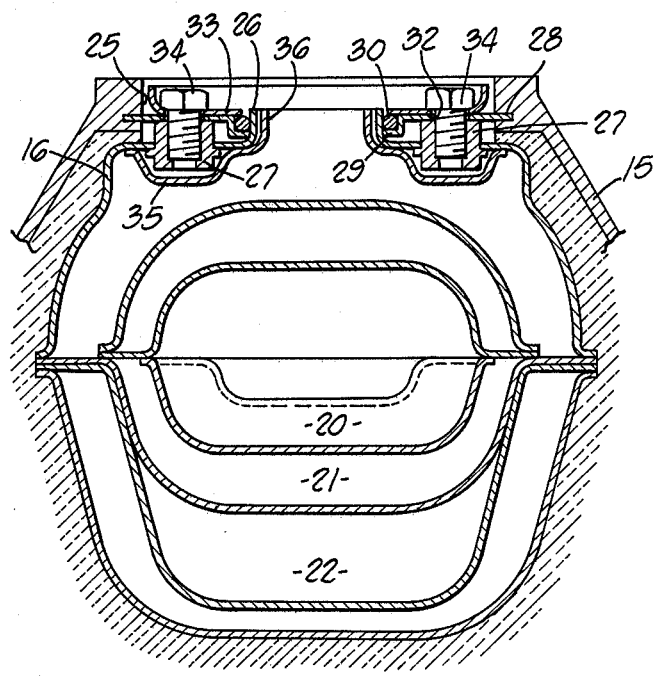
FIG. 2 is a sectional elevation taken substantially on the lines 2—2 as shown in FIG. 1.

Referring to the drawings, the internal combustion engine generally designated 1 has a plurality of pistons 2 reciprocating in cylinders 3 and forming combustion chambers 4. An exhaust valve 5 and at least one intake valve, not shown, are provided for each combustion chamber 4. An exhaust port 6 is provided for each of the combustion chambers 4, and an exhaust manifold 7 is provided to receive exhaust gases from the exhaust port 6. The exhaust manifold 7 is connected by flange 8 and threaded fastenings 9 to the cylinder head 10.

An intake manifold 12 is provided with a heat transfer wall 13 so that air-fuel mixtures in the riser passages 14 can be heated from the exhaust gases before being introduced into the combustion chambers 4. The passages connecting the intake manifold 12 to the combustion chambers 4 are not shown. The exhaust manifold 7 comprises a thick wall housing 15 which encloses a thin wall liner 16 formed of heat resistant material. The space between the liner 16 and the housing 15 is filled with insulation material 17. The liner 16 has a plurality of inlet tubes 18 which receive hot exhaust gases from the exhaust port 6. The liner 16 contains an inner chamber 20 which receives the hot gases through the inlet tubes 18, an intermediate chamber 21, and an outer chamber 22 connected in series and arranged to discharge through the outlet pipe 23. Both the inlet tubes 18 and the outlet pipe 23 are mounted for differential expansion movement.

Means are provided for heating the wall 13 through a lateral opening 25 provided in the housing 15. A tubular extension 26 is provided on the liner 16 which projects into the lateral opening 25. Internally threaded sockets 27 are fixed to the liner 16 and extend into the housing opening 25. These sockets 27 are spaced laterally from the tubular extension 26. A stationary support ring 28 is fixed in the housing opening 25 and this ring 28 is provided with an inner portion 29 which encircles the tubular extension 26 and provides a groove to receive the seal ring 30. Clearance openings 32 are provided in the stationary support ring 28 to receive threaded fasteners 34.

A guide plate 33 engages the stationary support ring 28 and the threaded fasteners 34 extend through the guide plate and the support ring 28 and engage the internally threaded sockets 27. A shield plate 35 is fixed within the liner 16 and serves to isolate the lower ends of the threaded fasteners 34 from direct contact with hot exhaust gases within the liner 16. The shield plate 35 is provided with a tubular portion 36 which projects into the tubular extension 26 of the liner 16.

The construction just described serves to support the thin wall multi-chamber liner 16 at the lateral opening 25 in the housing, which is needed for heating of the intake mixtures through the heat transfer wall 13. The inlet tubes 18 of the liner 16 and its outlet pipe 23 are all free to move to accommodate differential expansion.

Having fully described our invention, it is to be understood that we are not be limited to the details herein set forth but that our invention is of the full scope of the appended claims.

We claim:

1. For use with an internal combustion engine having an inlet manifold provided with a heat transfer wall, an exhaust manifold comprising a thin wall liner spaced within and enclosed by a thick wall housing, and the housing having a lateral opening communicating with the heat transfer wall, the improvement comprising, in combination: a tubular extension on the liner projecting into the lateral opening in the housing, internally threaded sockets fixed to the liner extending into the housing opening and spaced laterally from said tubular extension, a stationary support ring fixed in said housing opening and having a portion encircling said tubular extension, clearance openings in said stationary support ring, a guide plate engaging said stationary support ring, threaded fasteners extending through said guide plate and clearance openings and engaging said internally threaded sockets, and a shield plate within said liner serving to isolate otherwise exposed ends of the threaded fasteners from hot exhaust gases within said liner.

2. For use with an internal combustion engine having an inlet manifold provided with a heat transfer wall, an exhaust manifold comprising a thin wall liner spaced within and enclosed by a thick wall housing, and the housing having a lateral opening communicating with the heat transfer wall, the improvement comprising, in combination: a tubular extension on the liner projecting into the lateral opening in the housing, internally threaded sockets fixed to the liner extending into the housing opening and spaced laterally from said tubular extension, a stationary support ring fixed in said housing opening and having a portion encircling said tubular extension, clearance openings in said stationary support ring, threaded fasteners extending through said clearance openings and engaging said internally threaded sockets, and a shield plate within said liner serving to isolate otherwise exposed ends of the threaded fasteners from hot exhaust gases within said liner.

* * * * *